(12) United States Patent
van der Merwe

(10) Patent No.: US 9,479,070 B2
(45) Date of Patent: Oct. 25, 2016

(54) POWER CONVERSION SYSTEM

(71) Applicant: Franklin Electric Company, Inc., Fort Wayne, IN (US)

(72) Inventor: Lyon van der Merwe, Oriel (ZA)

(73) Assignee: Franklin Electric Co., Inc., Fort Wayne, IN (US)

( * ) Notice: Subject to any disclaimer, the term of this patent is extended or adjusted under 35 U.S.C. 154(b) by 0 days.

(21) Appl. No.: 14/187,206

(22) Filed: Feb. 21, 2014

(65) Prior Publication Data

US 2014/0167661 A1    Jun. 19, 2014

Related U.S. Application Data

(63) Continuation of application No. PCT/US2012/051576, filed on Aug. 20, 2012.

(60) Provisional application No. 61/526,002, filed on Aug. 22, 2011.

(51) Int. Cl.
| | |
|---|---|
| *H02P 3/18* | (2006.01) |
| *H02M 3/335* | (2006.01) |
| *H02J 3/38* | (2006.01) |
| *H02P 6/08* | (2016.01) |

(52) U.S. Cl.
CPC .......... *H02M 3/33569* (2013.01); *H02J 3/383* (2013.01); *H02M 3/33507* (2013.01); *H02P 6/08* (2013.01); *H02J 3/387* (2013.01); *Y02E 10/563* (2013.01)

(58) Field of Classification Search
USPC ............ 318/772, 762, 769, 800, 400.3, 814, 318/821, 508, 509, 533; 363/131, 65, 126, 363/37, 40; 307/44, 82, 98; 234/601; 327/304, 177

See application file for complete search history.

(56) References Cited

U.S. PATENT DOCUMENTS

| | | | |
|---|---|---|---|
| 3,222,535 | A | 12/1965 | Engelhardt |
| 4,238,821 | A | 12/1980 | Walker |
| 4,274,044 | A | 6/1981 | Barre |
| 4,390,940 | A | 6/1983 | Corbefin et al. |
| 4,443,840 | A | 4/1984 | Geissler et al. |
| 4,494,180 | A | 1/1985 | Streater et al. |

(Continued)

FOREIGN PATENT DOCUMENTS

| | | |
|---|---|---|
| EP | 1 389 829 | 2/2004 |
| WO | 2010/144637 | 12/2010 |

OTHER PUBLICATIONS

Search Report dated Jan. 23, 2015 in corresponding European Application No. 12825741.7.

(Continued)

*Primary Examiner* — Jorge L Carrasquillo
(74) *Attorney, Agent, or Firm* — Faegre Baker Daniels LLP

(57) ABSTRACT

This disclosure relates to a power conversion system to power a variable impedance load with a variable power source, the power conversion system comprising a power converter including input terminals adapted to receive variable power from the variable power source and output terminals providing a converted power to the variable impedance load based on the variable power received at the input terminals. The power converter increases the input voltage to an output voltage. The power converter is configured to reflect a source impedance of the variable power source to the variable impedance load.

20 Claims, 6 Drawing Sheets

(56) References Cited

U.S. PATENT DOCUMENTS

| | | | |
|---|---|---|---|
| 4,580,090 A | 4/1986 | Bailey et al. | |
| 4,604,567 A | 8/1986 | Chetty | |
| 4,620,140 A | 10/1986 | Chonan | |
| 4,649,334 A | 3/1987 | Nakajima | |
| 4,695,785 A | 9/1987 | Mieth et al. | |
| 4,695,935 A | 9/1987 | Oen et al. | |
| 4,729,081 A * | 3/1988 | Nilssen | H05B 41/28 363/126 |
| 4,812,634 A | 3/1989 | Ohta et al. | |
| 4,916,382 A | 4/1990 | Kent | |
| 4,922,396 A | 5/1990 | Niggemeyer | |
| 5,001,415 A | 3/1991 | Watkinson | |
| 5,084,664 A | 1/1992 | Gali | |
| 5,111,372 A | 5/1992 | Kameyama et al. | |
| 5,179,508 A | 1/1993 | Lange et al. | |
| 5,324,990 A | 6/1994 | Cunningham | |
| 5,493,155 A | 2/1996 | Okamoto et al. | |
| 6,057,665 A | 5/2000 | Herniter et al. | |
| 6,204,630 B1 | 3/2001 | James | |
| 6,275,403 B1 | 8/2001 | McNulty et al. | |
| 6,330,170 B1 | 12/2001 | Wang et al. | |
| 6,490,177 B1 * | 12/2002 | Figueroa | H02M 3/335 363/131 |
| 6,583,523 B1 | 6/2003 | Bhate | |
| 6,768,285 B2 | 7/2004 | James | |
| 6,862,195 B2 | 3/2005 | Jitaru | |
| 7,148,650 B1 | 12/2006 | McNulty et al. | |
| 7,443,052 B2 * | 10/2008 | Wendt | H02J 3/38 307/44 |
| 7,843,085 B2 | 11/2010 | Ledenev | |
| 7,868,482 B2 * | 1/2011 | Greene | H02J 1/10 307/82 |
| 7,960,870 B2 | 6/2011 | Besser et al. | |
| 8,233,301 B1 | 7/2012 | Guo | |
| 2004/0027112 A1 | 2/2004 | Kondo et al. | |
| 2004/0183513 A1 | 9/2004 | Vinciarelli | |
| 2005/0286278 A1 * | 12/2005 | Perreault | H02M 3/285 363/65 |
| 2008/0122449 A1 * | 5/2008 | Besser | G05F 1/67 324/601 |
| 2008/0179949 A1 * | 7/2008 | Besser | H02J 7/0068 307/24 |
| 2009/0160258 A1 * | 6/2009 | Allen | H02J 1/10 307/82 |
| 2009/0206804 A1 * | 8/2009 | Xu | H02M 3/1584 323/234 |
| 2009/0261764 A1 * | 10/2009 | Hirata | H02P 6/26 318/400.29 |
| 2010/0073969 A1 * | 3/2010 | Rajagopalan | H02M 1/10 363/37 |
| 2011/0032047 A1 * | 2/2011 | Yuzurihara | H01J 37/32082 332/108 |

OTHER PUBLICATIONS

International Search Report for PCT Application No. PCT/US2012/051576, issued Oct. 29, 2012, 3 pgs.
International Preliminary Report on Patentability for PCT Application No. PCT/US2012/051576, issued Feb. 25, 2014, 9 pgs.

* cited by examiner

POWER CONVERSION SYSTEM

CROSS-REFERENCE TO RELATED APPLICATIONS

The present non-provisional patent application is a continuation of International Application Ser. No. PCT/US2012/051576 filed on Aug. 20, 2012, which claims the benefit of priority from U.S. Provisional Patent Application No. 61/526,002 filed on Aug. 22, 2011, both entitled "POWER CONVERSION SYSTEM" and expressly incorporated by reference herein in their entirety.

FIELD OF THE DISCLOSURE

A system and a method for converting power from a variable power source, and more particularly a system and method for increasing the reliability and/or efficiency of a power converting system.

BACKGROUND OF THE DISCLOSURE

Power sources provide electrical power that varies in accordance with conditions affecting the power source. Exemplary power sources include fuel cells, wind generators, photovoltaic modules and human powered generators. Power sources can output electricity with alternating current (AC) or direct current (DC). Wind generators, for example, can be configured to output single-phase, three-phase or DC power. The output of a wind generator varies with air speed and humidity. The output of a photovoltaic module converting solar energy varies with temperature, incidence angle and insolation level. Power output can also depend on the load connected to the power source. Power converters are used to convert the power output by the power source. As the functionality and complexity of these devices increases, exposure to extreme temperatures, solar radiation, wind and humidity increasingly reduces their reliability which increases costs.

SUMMARY

A system and method for converting power from a variable power source, and more particularly a system and method for increasing the reliability and/or efficiency of a power converting system are provided herein. The variable power source may comprise a solar panel array, wind generator and other power sources whose output varies over time. The system comprises a power converter configured to be very reliable by the selection of its components, which selection is enabled by the power converter topology and control strategy. Reliability is an important factor, particularly in remote or desert areas. In one example, a solar panel array voltage is increased by an unregulated power converter and supplied to a motor drive to power a motor driving a water pump. The motor drive is coupled to a maximum power point control logic configured to operate the solar panel array at its maximum power point even as environmental or pumping load conditions vary over time. The power converter is configured to reflect the solar panel array impedance to the motor drive, enabling the maximum power point control logic to determine the maximum power point of the solar array panel based on the voltage received by the motor drive from the power converter.

In one embodiment according to the disclosure, a power conversion system is provided. The power conversion system comprises an input terminal adapted to receive variable power having an input voltage from a variable power source having a source impedance; an output terminal adapted to provide converted power having an output voltage to a variable impedance load, the variable impedance load receiving a load voltage based on the output voltage; and a power converter. The power converter includes a switching controller, power switches controlled by the switching controller, a transformer coupled to the power switches, a rectification circuit configured to rectify an alternating current output from the transformer, and input and output capacitors, the switching controller configured to switch the power switches in an alternating unregulated manner to increase the input voltage to the output voltage. The power converter is configured to reflect the source impedance of the variable power source to the variable impedance load.

In a variation of the present embodiment, the switching controller is configured to switch the power switches at a frequency of between about 20 KHz and 100 KHz to reduce the size of the input and output capacitors, and the input and output capacitors are selected such that the reflected source impedance represents a scaled version of the variable power source impedance characteristics. In one example, the switching controller is configured to switch the power switches at a frequency of between about 20 KHz and 50 KHz. In another example, the switching controller is configured to switch the power switches at a frequency of between about 30 KHz and 50 KHz.

In another variation of the present embodiment, the power conversion system further comprises a motor drive as the variable impedance load and a maximum power point control logic adapted to vary the speed of a motor coupled to the motor drive based at least on the load voltage to cause the variable power source to operate at or near a maximum power point.

In an example of the present variation, the maximum power point control logic is adapted to pause the motor drive at periodic intervals, determine the output voltage while the motor drive is paused, and vary the speed of the motor while the motor drive is not paused to maintain the output voltage within a range which is a fraction of the output voltage determined while the motor drive was paused.

In another example of the present variation, the power conversion system further comprises a fluid pump coupled to the motor. The power conversion system is configured to maximize a fluid pumping efficiency by causing the variable power source to operate at the target power point.

In a further example of the present variation, the power conversion system further comprises a solar panel array as the variable power source. In a variation thereof, the power conversion system comprises a plurality of solar panels as the variable power source, and a plurality of power converters coupled to the plurality of solar panels and to the motor drive.

In a yet further example of the present variation, the power converter has an output impedance which is up to about 15% of the source impedance when the motor drive operates at the target power point. In a variation thereof, the power converter has an output impedance which is up to about 10% of the source impedance when the motor drive operates at the target power point.

In another variation of the present embodiment, the variable impedance load is a motor drive configured to vary the speed of a motor coupled to the motor drive based on the load voltage to cause the variable power source to operate at a target power point based on a maximum power point of the variable power source.

In a further variation of a power conversion system as in any one of the preceding variations of the present embodiment, the switching controller is configured to switch the power switches at a frequency which is independent of the variable impedance load and the variable power source. In one example of the preceding variation, the switching controller is configured to switch the power switches in a symmetrical alternating mode at a maximum duty cycle.

In a yet further variation of the present embodiment, the power converter is thermally insensitive in a temperature range between 10° C. and 40° C. and is insensitive to thermal cycling.

In a still further variation of the present embodiment, the power converter is devoid of electrolytic capacitors.

Additional variations of the present embodiment encompass all the foregoing examples and variations, alone or arranged in any suitable combination.

In another embodiment according to the disclosure, a method of operating a power conversion system is provided. The method comprises receiving a variable power having an input voltage from a variable power source having a source impedance; converting the variable power to a converted power by increasing the input voltage to an output voltage with a power converter; receiving, by a variable impedance load, a load voltage based on the output voltage; and reflecting the source impedance to the variable impedance load with the power converter.

In a variation of the present embodiment, the power converter includes a switching controller, power switches controlled by the switching controller, a transformer coupled to the power switches, a rectification circuit configured to rectify an alternating current output from the transformer, and input and output capacitors. The switching controller is configured to switch the power switches in an alternating unregulated manner to increase the input voltage to the output voltage.

In one example of the foregoing, the switching controller is configured to switch the power switches at a frequency of between about 20 KHz and 100 KHz to reduce the size of the input and output capacitors, and the input and output capacitors are selected such that the reflected source impedance represents a scaled version of the variable power source impedance characteristics.

In another variation of the present embodiment, the method further comprises operating the power switches at a frequency which is independent of the variable impedance load and the variable power source.

In a further variation of the present embodiment, the method further comprises operating the power switches in a symmetrical alternating mode at a maximum duty cycle.

In a still further variation of the present embodiment, the variable power source is a solar panel array.

In further variations of a method as in any one of the preceding variations of the present embodiment, the method further comprises varying, based on the load voltage, the speed of a motor coupled to the variable impedance load to operate the variable power source at a target power point corresponding to a maximum power point of the variable power source.

In one example thereof, the method further comprises pausing the motor drive at periodic intervals; determining the load voltage while the motor drive is paused; and varying the speed of the motor to maintain the load voltage within a range of about 0.76 and 0.82 of the load voltage determined while the motor drive was paused.

In another example thereof, the method further comprises driving a fluid pump with the motor to pump a fluid.

In yet another embodiment, the variable power source comprises a plurality of solar panels. The method further comprises each of a plurality of power converters receiving variable power from each of the plurality of solar panels; and the variable impedance load receiving the converted power from each of the plurality of power converters.

In another embodiment according to the disclosure, a power conversion system is provided. The power conversion system comprises power converting means for increasing an input voltage of a variable power sourced by a variable power source into an output voltage; an input terminal coupled to the power converting means and adapted to receive the variable power from the variable power source; and an output terminal coupled to the power converting means and providing a converted power having the output voltage to the variable impedance load. The power converting means are configured to reflect a source impedance of the variable power source to the variable impedance load. Variations of the present embodiment include the variations and examples of a power conversion system as described above, alone or arranged in any suitable combination.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some or none of the enumerated advantages.

DESCRIPTION OF THE DRAWINGS

The features and advantages of the disclosure will become more readily appreciated as the same become better understood by reference to the following detailed description when taken in conjunction with the accompanying drawings, where.

Figure 1:
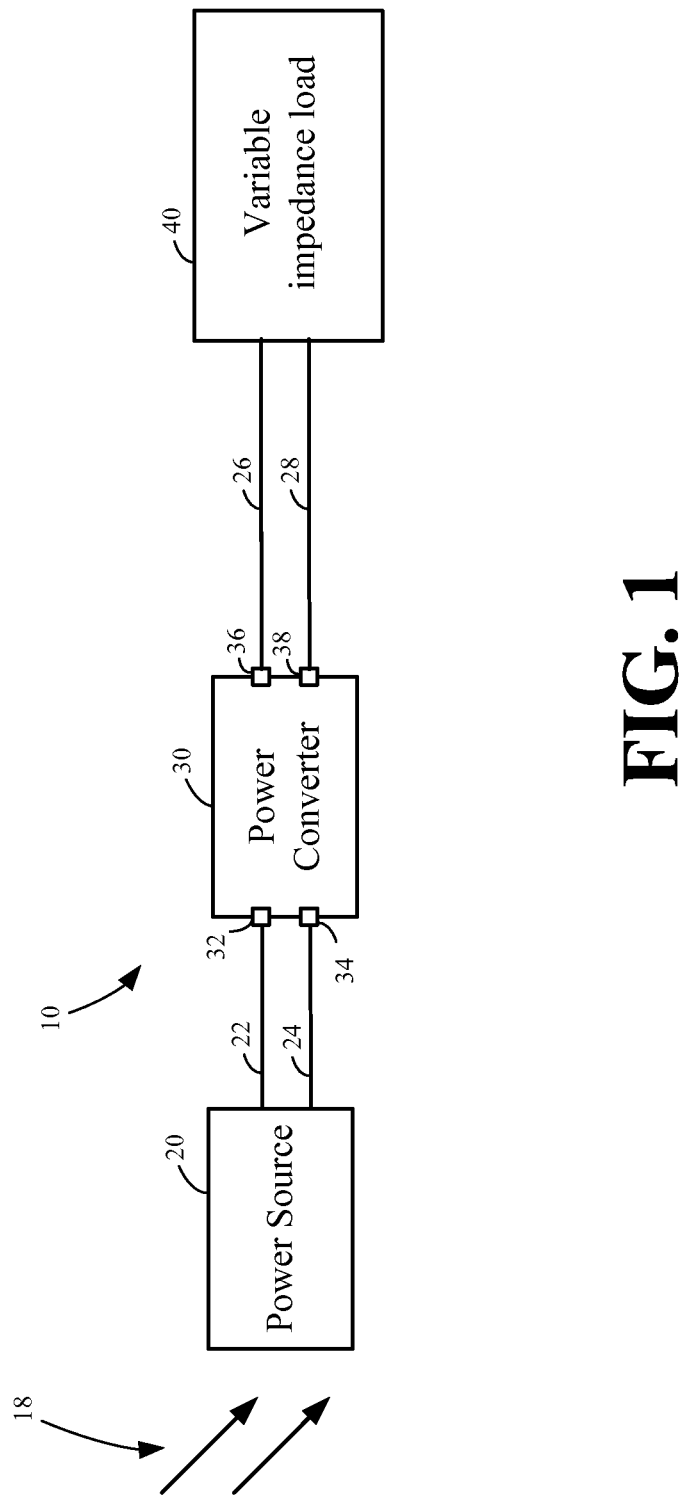
FIG. 1 is a block diagram of an embodiment of a power conversion system according to the disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the disclosure, and such exemplifications are not to be construed as limiting the scope of the claims in any manner.

DETAILED DESCRIPTION

For the purposes of promoting an understanding of the principles of the disclosure, reference will now be made to the embodiments illustrated in the drawings, which are described below. The embodiments disclosed below are not intended to be exhaustive or limit the claims to the precise form disclosed in the following detailed description. Rather, the embodiments are chosen and described so that others skilled in the art may utilize their teachings. It will be understood that no limitation of the scope of the claims is thereby intended. The present invention includes any alterations and further modifications in the illustrated devices and described methods and further applications of the principles of the disclosure which would normally occur to one skilled in the art to which the disclosure relates.

Except where a contrary intent is expressly stated, terms are used in their singular form for clarity and are intended to include their plural form. For example, the terms conductor, switch, line, resistor, capacitor and inductor include, respectively, conductors, switches, lines, resistors, capacitors and inductors.

The disclosure relates to systems and methods to convert electrical power. Referring to FIG. 1, a block diagram of one embodiment of a power conversion system according to the disclosure is provided therein. The power conversion system, denoted by numeral 10, comprises a power converter 30 including a power converter circuit adapted to receive a first variable power having an input voltage from a variable power source 20 through conductors 22, 24 and input terminals 32, 34 and to provide converted power having an increased output voltage to a variable impedance load 40 through output terminals 36, 38 and conductors 26, 28. Power converter 30 has an input impedance and an output impedance configured to reflect a source impedance of the variable power source to the variable impedance load. In one example, the input and output impedances are configured to be substantially negligible. In another example, the output voltage provided by the power converter to the variable impedance load is always higher than the input voltage when the power converter is operating. If the power converter is shut off, converted power is not provided to the output terminals.

Variable power source 20 receives variable energy from an energy source 18 and converts the variable energy to variable power. Exemplary energy sources include wind, solar radiation, fuel cells and kinetic energy systems. Variable power sources operate in a non-linear manner if the relationship between the voltage and current of the variable power is a function of the impedance of the load coupled to it. Load impedances can be selected or controlled such that the product of the voltage and current yields a maximum value. In a photovoltaic source, for example, for each set of environmental conditions a load impedance exists that causes the photovoltaic source to supply maximum power. The voltage and current corresponding to the maximum power may be referred to as the maximum power point voltage and the maximum power point current. The maximum power point occurs at the knee of the voltage/current curve where $dP/dV=0$. Typically, this point occurs at a photovoltaic source output voltage of between about 0.76 to 0.82 of the open circuit voltage of the photovoltaic source.

If the energy from energy source 18 changes, the power available from variable power source 20 may change. If the energy from energy source 18 is constant, the power available from variable power source 20 may be constant or may change. In one example, the variable power source is non-linearly responsive to the impedance of the load coupled to it. Thus, while the available energy may be constant, the power transferred varies as a function of the load impedance, and the corresponding voltage may also vary. The term "variable impedance load" is used herein to refer to a load having an input impedance that varies as a function of a controllable factor so that the load can be controlled to present a target impedance. In one example, the variable impedance load is a motor drive coupled to a motor, and the load impedance is varied by changing the speed of the motor. In one example, the target impedance is chosen to cause the variable power source to operate at the target power point. As described further below with reference to FIGS. 8 and 9, the power conversion efficiency of the system is maximized when the variable power source operates at the maximum power point and the power from the variable power source is efficiently transferred to the power converter and the variable impedance load. Various maximum power point tracking schemes are known for causing the variable power source to operate at or near the maximum power point. The term "target power point" is used herein to refer to the target of the maximum power point tracking scheme. In one example, the motor drive comprises a controller which incorporates a maximum power point scheme. The maximum power point scheme determines whether to increase or decrease the motor speed to operate the variable power source at its maximum power point even as environmental and mechanical load conditions vary over time. Due to the characteristics of the power converter, the maximum power point scheme is able to control the maximum power point based on the voltage and/or current received from the power converter instead of the voltage and current at the variable power source. Accordingly, additional cables from the variable power source to the motor drive are not necessary. Of course, a maximum power point controller may be electrically coupled to the motor drive or incorporated with the controller of the motor drive.

In one form thereof, power converter 30 comprises components including a step-up transformer having a primary winding and a secondary winding that define a step-up ratio, two power switches controlled by a switching controller, and a rectifier circuit coupled across the secondary winding. The power switches have two power contacts and a control node. The switching controller is coupled to the control nodes to operate the power switches. The switching controller causes the power switches to induce a stepped-up voltage in the secondary winding. The induced voltage is rectified and the stepped-up rectified voltage is provided to output terminals 36, 38. The components are selected so that the impedance of variable power source 20 is reflected to variable impedance load 40 and the impedance of variable impedance load 40 is reflected to variable power source 20 in a substantially ideal manner in which a transformation model of the converter is based on the transformer step-up ratio. In one variation thereof, the power converter has substantially negligible impedance. In another variation thereof, the output impedance of the power converter is at most 15% of the variable power source impedance. In one example, the input impedance of the power converter is at most 10% of the variable power source impedance. In a further variation thereof, the magnitude of the aggregate non-ideal currents in the primary side of the power converter is less than 15% of the magnitude of the current flowing through its input terminals. In one example, the magnitude of the aggregate non-ideal currents in the primary side of the power converter is less than 10% of the magnitude of the current flowing through its input terminals.

In a yet further variation thereof, the power converter is unregulated. By "unregulated" it is meant that the duty-cycle of the power switches is independent of the incoming or outgoing variable power, voltage or current within the operating voltage range of the power converter defined by the selection of its components. In another variation thereof, the switching controller operates independently of the variable impedance load and the variable power source. Independent operation is achieved by setting the duty cycle of the power switches without the benefit of a separate or external signal from the variable impedance load or the variable power source. As described further below, in some embodiments the power converter limits its output voltage if the output voltage would otherwise exceed its operating voltage range, but the voltage limiting functions are performed without the benefit of a separate or external signal. In one example, each of the power switches is controlled to operate at a maximum duty cycle, which equals 50% minus the switching time. The switching time is typically in the order of microseconds. The switching time includes the state transition time of the switches. The switching time may also include a short dead time introduced to ensure the switches do not have overlapping on-times. In one example, the short dead time is 1.0 microsecond. In another example, the short dead time is less than 0.5 microsecond. In a further example, the short dead time is about 0.15 microsecond. In a further example, the duty-cycle of the power switches is constant, within the normal operating range of the power converter. The power switches may be switched at a frequency of between about 20 KHz and 100 KHz to reduce the size of the input and output capacitors. In one example, the switching controller is configured to switch the power switches at a frequency of between about 20 KHz and 50 KHz. In another example, the switching controller is configured to switch the power switches at a frequency of between about 30 KHz and 50 KHz The input and output capacitors are selected such that the reflected source impedance represents a scaled version of the variable power source impedance characteristics. The selection of frequency and short dead time enables use of non-electrolytic capacitors sufficiently large to smooth the load on the variable power source for only a short time when the switches are not conducting current. Small capacitors also increase the shunt impedance which results in a more ideal power converter, which is able to reflect the source impedance such that it represents a scaled version of the variable power source impedance characteristics. In this manner, a maximum power point control scheme based on the output voltage of the power converter will control according to the maximum power point of the variable power source instead of the maximum power point of the load or the power converter.

Figure 3:
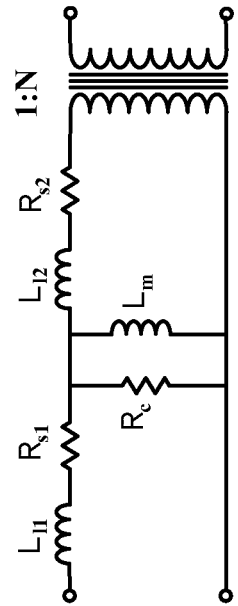
FIGS. 2-5 are a schematic diagrams of a transformer and corresponding transformer model, and of impedance reflection models.
Figure 2:
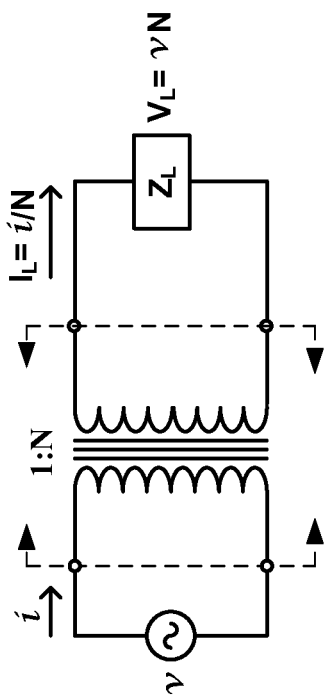

Referring now to FIGS. 2 and 3, schematic diagrams of a transformer and a transformer model are provided. Referring to FIG. 2, a transformer is shown receiving a voltage v which is stepped-up to an output voltage $V_L = v$ N. A current $I_L = i/N$ flows through a load $Z_L$. A model of the transformer is shown in FIG. 3 to illustrate that the transformer's primary and secondary windings have series impedance including inductance and resistance $L_{I1}, R_{s1}$ and $L_{I2}, R_{s2}$, respectively. The model also includes a shunt impedance represented by the transformer's core losses $R_c$ and magnetization inductance $L_m$. The series and shunt impedance are non-ideal to the extent that they impact the ability to reflect the variable power source impedance to the variable impedance load or vice versa. A transformer, applicable in any of the converters described herein, is configured to maximize the shunt impedance and minimize the series impedance so as to minimize non-ideal currents resulting from the series and shunt impedances. In a variation thereof, the transformer comprises a center-tapped primary winding, the two primary winding portions on either side of the tap wound together and comprising stranded Litz wire. In one example, the two primary portions are bifilar wound. The secondary winding comprises stranded wire. In one example, each primary winding portion comprises 7 turns of 16 strand 0.4 mm wire while the secondary winding comprises 83 turns of 3 strand 0.4 mm wire. In one example, the transformer core comprises high frequency grade ferrite of a double E configuration with no air gap. In another example, a toroid ferrite core is used. Core material and configuration are selected to minimize iron losses and optimize power density at a selected switching frequency. In one example, the switching frequency is about 30 kHz. Higher or lower frequencies can be selected to match the core's design and optimize operation of the converter.

Figure 5:
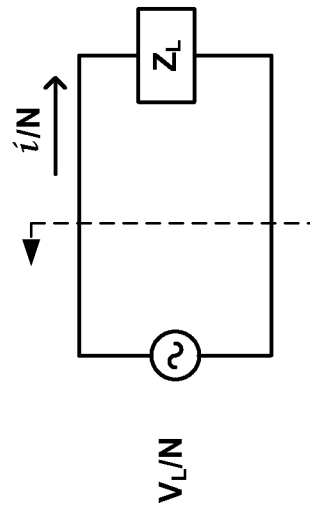
Figure 4:
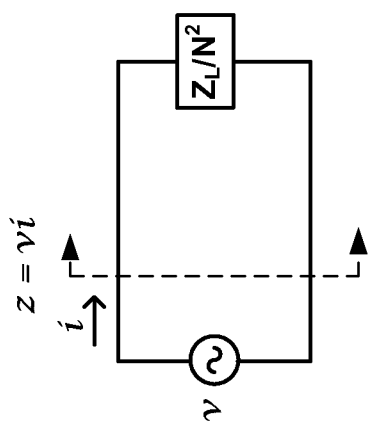

Referring to FIGS. 4 and 5, schematic diagrams of impedance reflection models are provided therein. Referring to FIG. 4, a load reflection model of an ideal transformer is provided to illustrate that, when the impedance of the transformer is negligible, the load impedance reflected to the source is represented by a transformation comprising essentially the inverse of the square of the step-up ratio. Referring to FIG. 5, a source reflection model of an ideal transformer is provided. Thus, in a converter comprising a transformer with negligible series impedance and substantial shunt impedance, the power source and load transformation models are simplified by selection of components with insubstantial magnitudes relative to the load and source impedances such that the load and source impedances are substantially represented by transformation models based solely on the step-up ratio of the transformer. The converter impedance is considered relatively insubstantial when it is less than 15% of the source impedance.

Figure 6:
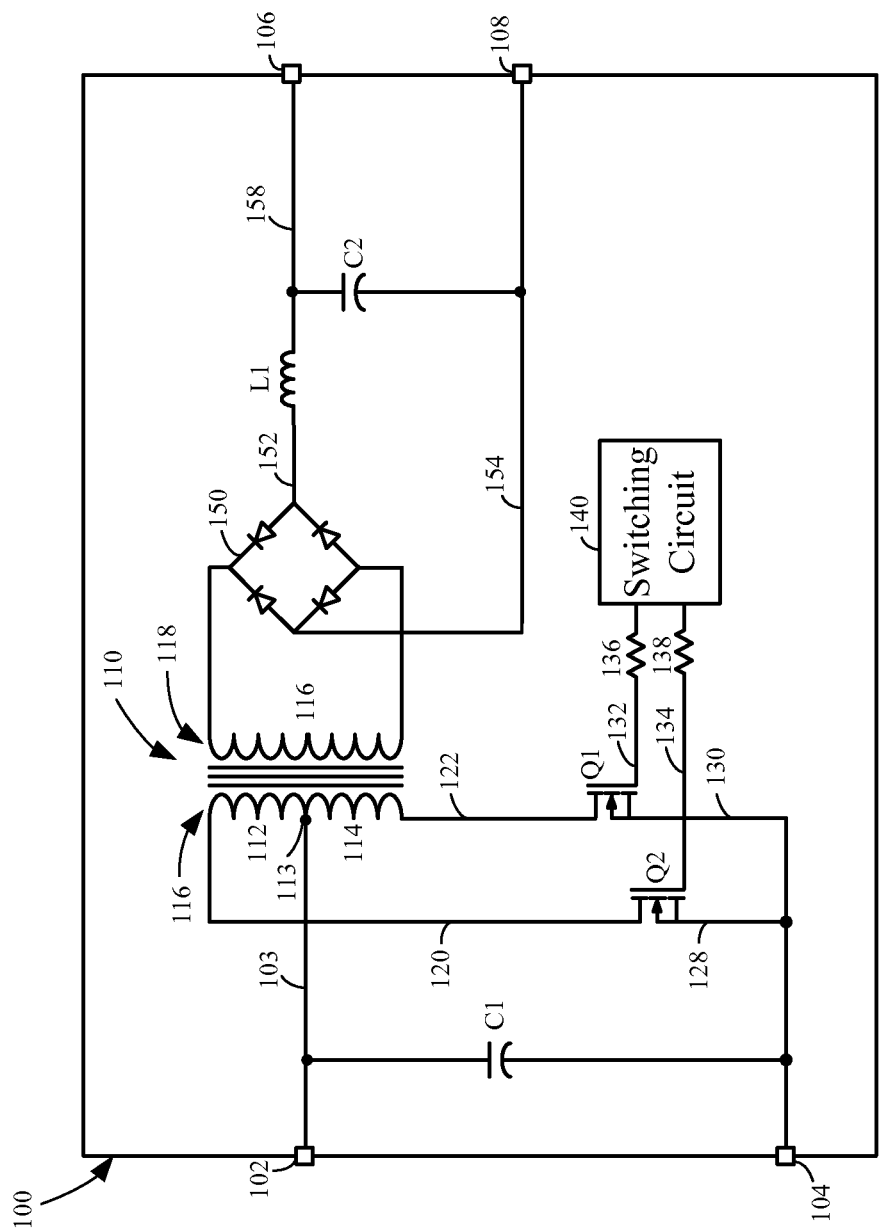
FIG. 6 is a schematic diagram of an embodiment of a power converter according to the disclosure.

Referring now to FIG. 6, a schematic diagram of an embodiment of a power converter according to the disclosure, denoted by numeral 100, is provided therein. Power converter 100 includes input terminals 102, 104, output terminals 106, 108, a step-up transformer 110 having a primary winding 116 and a secondary winding 118 that define a step-up ratio, primary winding 116 having two leads coupled to lines 120, 122 and an intermediate node 113 coupled to input terminal 102 by conductor 103. Primary winding 116 is tapped at node 113 to define a first primary winding portion 112 and a second primary winding portion 114. In one example, the transformer is a high frequency ferrite transformer. Power converter 100 further includes two power switches Q1, Q2 coupled to leads 120, 122 and to input terminal 104 and a switching controller 140 providing gating signals to the control nodes of power switches Q1, Q2 through resistors 136, 138 and lines 132, 134, respectively. The gating signals drive power switches Q1, Q2 in a symmetrical alternating mode resulting in an alternating voltage and current output at secondary winding 118. In one example, the gating signals are square waves which are offset in time to prevent simultaneous conduction by power switches Q1, Q2. In one example, switches Q1, Q2 are MOSFET transistors.

A capacitor C1 is connected across input terminals 102, 104 to compensate for the inductance from conductors 22, 24. Capacitor C1 is small. Ideally, capacitor C1 is insensitive to thermal extremes and thermal cycling, which characteristic prolongs the life of the power converter under extreme hot conditions. In one example, capacitor C1 has a capacitance of up to about 10 µF and a low voltage rating of about 50 volts. In another example, capacitor C1 is non-electrolytic. In a further example, capacitor C1 is a dry capacitor. In a yet further example, capacitor C1 has a capacitance of up to about 4.7 µF. A rectifier circuit 150 is coupled across secondary winding 118.

The positive DC output of rectifier circuit 150 is coupled by line 152 to one side of an inductor L1. The other side of inductor L1 is coupled to output terminal 106 by line 158. The negative DC output of rectifier circuit 150 is coupled by line 154 to output terminal 108. A capacitor C2 is coupled across terminals 106, 108 forming, together with inductor L1, a high frequency output filter to filter out noise generated by the state transitions of power switches Q1, Q2. In one example, the switching frequency is selected to minimize the reactance of the output filter. The switching frequency may be, for example, greater than 20 KHz so as to avoid audible frequencies and less than 1 MHz to limit those losses and parasitic element effects that increase with frequency. Exemplary switching frequencies may be in the range between about 20 KHz and 100 KHz. In one example, the switching frequency is between about 20 KHz and 50 KHz. In another example, the switching frequency is between about 30 KHz and 50 KHz. In another example, inductor L1 has an inductance of up to about 30 µH and capacitor C2 has a capacitance of up to about 10 µF. In a further example, L1 has an inductance of up to about 15 µH and capacitor C2 has a capacitance of up to about 1 µF. A push-pull topology is shown in FIG. 6 although other configurations may be employed. Exemplary topologies include forward, fly-back, full bridge and half bridge.

In one variation thereof, switching controller 140 comprises an oscillating circuit. In one example, the oscillating circuit comprises an oscillating integrated circuit capable of generating two square wave signals in alternating mode. Exemplary programmable oscillating circuits include a self-oscillating half-bridge driver IR2153 manufactured by International Rectifier Corp. and a 555 timer integrated circuit.

In a further embodiment, the voltage output of the secondary winding is coupled to output terminals 106, 108 and rectification is provided, if necessary, by a circuit coupled to output terminals 106, 108 external to power controller 100. In one example, the load comprises the rectification circuit. The load receives the alternating voltage output from the power converter and converts the alternating voltage to DC voltage. In a yet further embodiment, the power converter is incorporated with the load.

Figure 7:
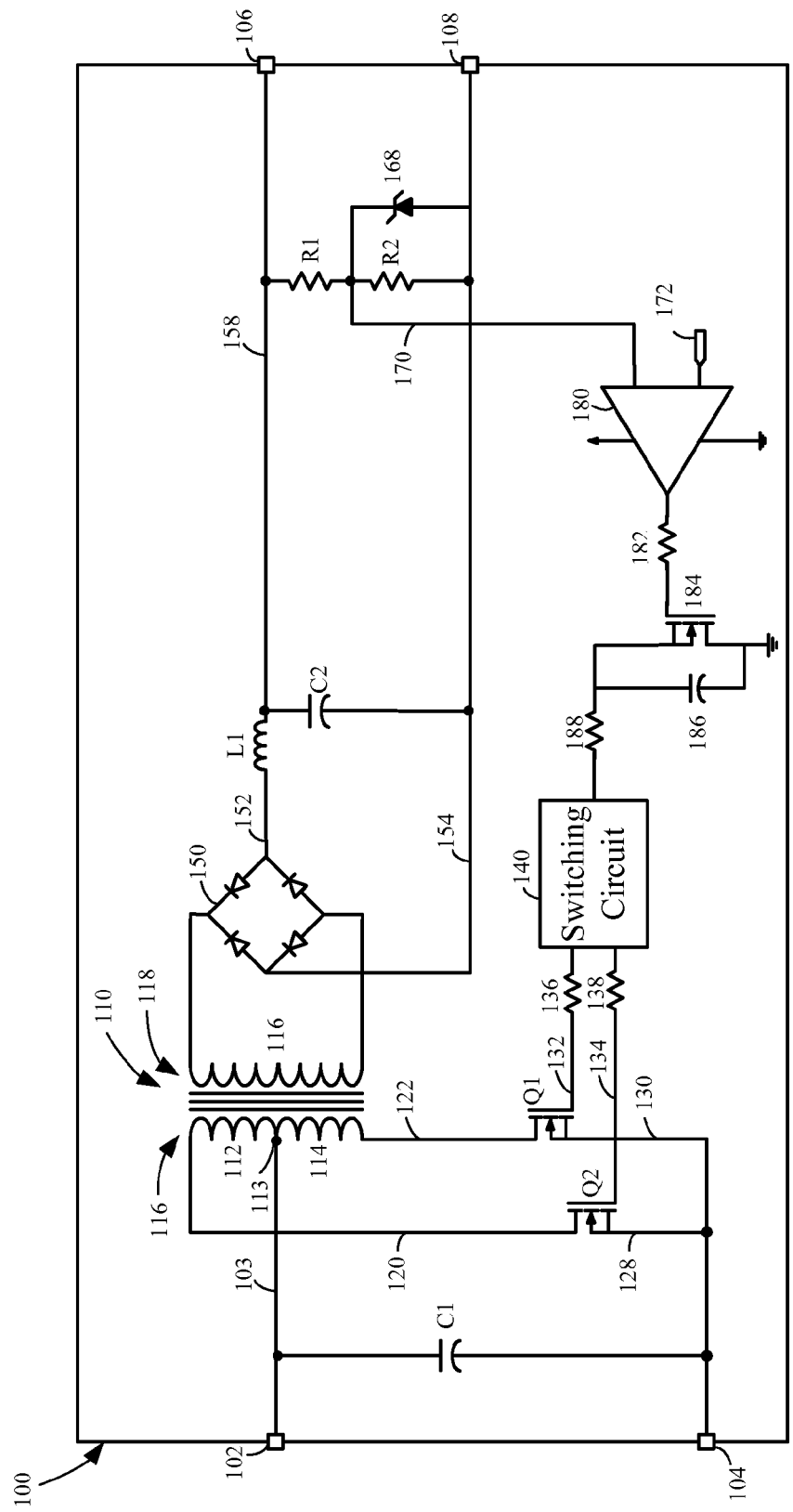
FIG. 7 is a schematic diagram of another embodiment of a power converter according to the disclosure.

In a variation of power converter 100 illustrated schematically in FIG. 7, an over-voltage protection circuit is provided. The over-voltage protection circuit disables switching controller 140 if the output voltage exceeds a threshold value. In one example, the threshold value is the upper limit of the operating voltage range of power converter 100. In one example, the over-voltage protection circuit comprises a voltage divider including resistors R1 and R2, a zener diode 168 in parallel with resistor R2, a comparator circuit 180 with hysteresis, such as a Schmitt trigger, receiving an output voltage indication from the voltage divider and a voltage reference 172 providing a reference voltage corresponding to the threshold value. Comparator circuit 180 compares the output voltage indication to the reference voltage of voltage reference 172 and changes its output state when the output voltage indication exceeds the threshold value. The output of comparator circuit 180 is connected by resistor 182, switch 184 and resistor 188 to switching controller 140. A capacitor 186 stabilizes the output of switch 184. In one example, when the output is enabled switch 184 disables switching controller 140. In another example, the reference voltage is set to protect the converter when power converter 100 is unloaded.

In another variation of converter 100, the components of the converter are thermally insensitive within a predefined temperature range. In one example, the range is between about −20° C. and 50° C. In another example, the range is between about 10° C. and 40° C. In a further form thereof, the electrical components of the power converter are insensitive to thermal cycling. Ceramic capacitors and other non-electrolytic capacitors are exemplary thermal cycling insensitive components.

Additional embodiments comprise any suitable combination of variations described above and hereinafter. In one example, converter 100 further comprises thermally insensitive components of negligible reactance. In another example, converter 100 comprises components of negligible impedance.

Figure 8:
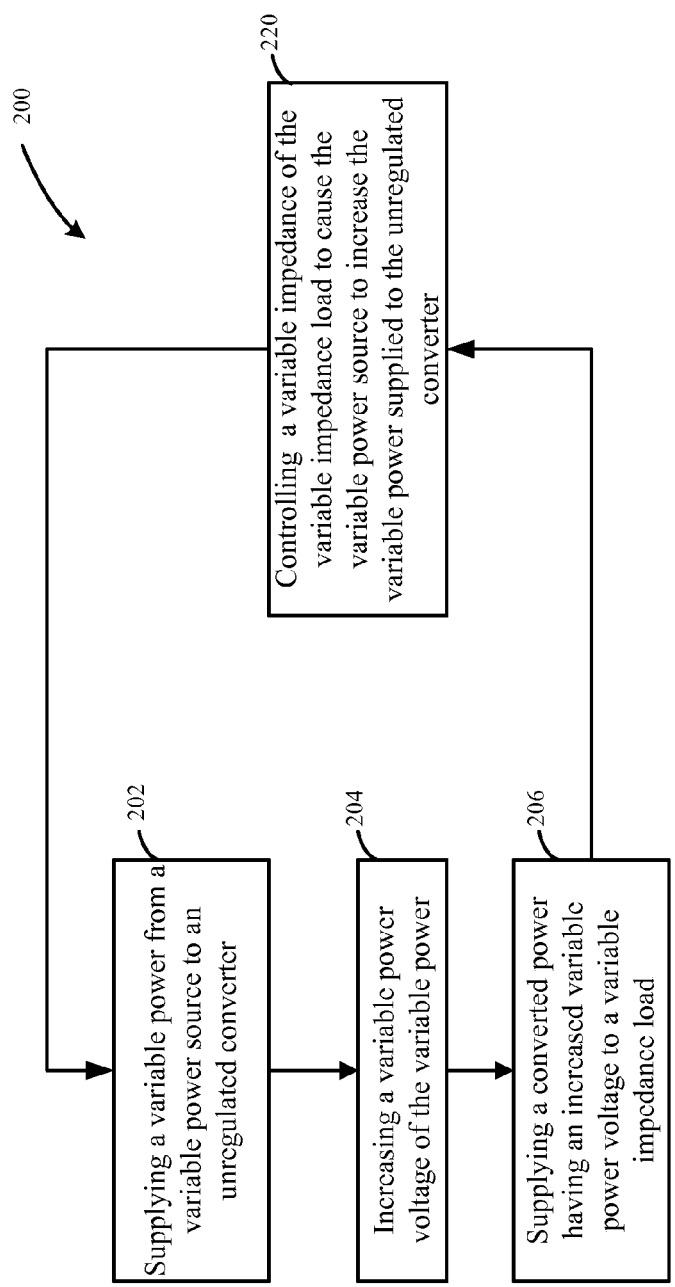
FIG. 8 is a flowchart of an embodiment of a power transfer method according the disclosure.

A method of converting power supplied by a variable power source will now be described with reference to a flowchart 200 depicted in FIG. 8. Flowchart 200 begins at 202, although the method is performed generally continuously while power converter 100 is operating. At 202, variable power from a variable power source is supplied to an unregulated converter. At 204, a variable voltage of the variable power is increased and, at 206, converted power is supplied to a variable impedance load. The converted power has an increased variable voltage and a corresponding reduced variable current. In one example, the variable power is converted by converter 100 configured according to any of the above-described configurations, variations and examples, and any suitable combinations thereof. The topology and components of the converter reflect the variable power source impedance to the variable impedance load and vice versa.

At 220, the variable impedance of the variable impedance load is controlled to cause the variable power source to increase the variable power supplied to the unregulated converter. Different maximum power point control circuits or logic algorithms are suitable to execute maximum power point search methods to match the impedance of the variable impedance load to the characteristic impedance of the variable power source. Exemplary methods include perturb-and-observe (P&O), incremental conductance and constant voltage, among others. The P&O method is a "hill climbing" method in which the load impedance is changed slightly to perturb the variable power source voltage and determine if the change is directionally correct. A sample of dP/dV is taken and, if dP/dV is positive, additional changes are made in the same direction until dP/dV becomes negative. At the inflection point, or knee, power is at the maximum. The incremental conductance method is another hill climbing method in which the incremental conductance dI/dV of the power source is used to compute dP/dV. The granularity of the perturbation can be selected to track the maximum power point very accurately.

The constant voltage method capitalizes on the observation that the maximum power point is substantially constant if environmental conditions are also substantially constant. For example, in the case of photovoltaic panels, it can be assumed that the maximum power point may remain substantially constant for periods spanning several minutes. The power point scheme may, therefore, set the control parameter once each period, potentially trading off slight efficiencies for simpler control algorithms. In the case of photovoltaic panels, the maximum power point is reached when the variable power source voltage is between about 76% and 82% of its open circuit voltage. At the maximum power point, the variable power source voltage may be referred to as the maximum power point voltage ($V_{MPP}$). The target power point is then defined based on this observation, accounting for processing variations. The open circuit voltage ($V_{OC}$) is obtained by unloading the variable power source. Since the variable power source impedance has been reflected to the load by the power converter in a substantially linear manner, a load open circuit voltage $V_{LOC}$ is sampled at the input terminals of the load and a load maximum power point voltage is computed as, for example, $V_{LMPP}=0.76\ V_{LOC}$.

In one example of a maximum power point control logic, the load open circuit voltage is measured while operation of the load is momentarily paused. The approximation differs from the actual load open circuit voltage by the effect of control circuitry and other components which remain connected even when the load is not driven. When operation of the load resumes, the load is operated to maintain the load maximum power point voltage, which is a fraction of the load open circuit voltage. The process is repeated at periodic intervals selected to achieve a desired efficiency. As the maximum power point may change during each interval, the efficiency may improve as the intervals shorten in time. However, as the intervals shorten, more pauses are required. An exemplary load includes a switching motor drive driving a motor. To measure the load open circuit voltage, the motor drive is paused by shutting off the motor drive switches for long enough to measure the load open circuit voltage after the motor stops rotating. The motor may require a few seconds to stop rotating. The motor drive may be paused every few minutes to measure $V_{LOC}$. The maximum power point control logic may determine $V_{LOC}$ and $V_{LMPP}$ more or less frequently depending on the desired efficiency.

At 220, the impedance of the variable impedance load is changed to increase the power output by the variable power source. In the constant voltage method, the impedance is changed until the voltage at the load input terminals, $V_L$, is about equal to $V_{LMPP}$. If the load is a motor drive and the motor is an induction motor, the impedance is changed by changing the frequency of the fundamental voltage of the motor. As the foregoing calculations demonstrate, utilization of a converter as described in the present disclosure simplifies maximum power point tracking by the constant voltage method by permitting maximum power point tracking based on the voltage at the load rather than voltage at the variable power source.

In a yet further embodiment according to the disclosure, the method described above is implemented in a power conversion system comprising a plurality of power sources, a plurality of power converters as in any of the preceding embodiments and a load comprising a motor drive and a motor. Exemplary motors include AC and DC motors. The power converters are coupled in parallel to increase the current supplied by the plurality of power sources and power converters. The motor drive includes a power circuit which converts power received from the power converters to a form suitable to the motor. The motor drive also includes a power controller which controls operation of the power circuit to perform the power conversion.

In one form thereof, the power circuit comprises a plurality of power switches controlled by the power controller according to a known pulse-width-modulating scheme. In one example, the motor drive operates in a manner substantially similar to that of a variable frequency drive configured to operate with AC power but modified to accept variable DC power. Exemplary modifications include adjustment of over and under voltage and current limits configured to protect the motor drive. Hardware modifications are also implemented to connect the incoming variable DC power to the power switches. In one example, AC power circuitry such as a rectification circuit is kept on the motor drive and additional circuitry is provided to connect the motor drive to the AC power circuitry in the event that the variable power source is not able to provide sufficient power to meet demand or to satisfy the minimum voltage requirement of the motor. In one form thereof, the fundamental voltage output by the power circuit has a variable frequency that varies linearly with the magnitude of the voltage in what is known as the volts-hertz curve. In one example, in which the load comprises a positive displacement pump, the volts-hertz relationship is represented by a first order equation (e.g. straight line relationship). In another example, the relationship is represented by a second order equation (e.g. quadratic relationship). In a further example, in which the load comprises a centrifugal pump, the frequency and voltage are related by a quadratic relationship. The minimum voltage requirement for an induction motor with lubricated bearings typically corresponds to about 20 Hertz. The minimum voltage requirement for an induction motor with roller bearings typically corresponds to about 3 Hertz.

The power controller is configured to implement a maximum power point tracking scheme. Accordingly, it adjusts the frequency of the fundamental voltage to cause the speed of the motor to change, which causes the impedance of the motor drive to change. The changed impedance is reflected to the variable power source, thereby changing the power output by the variable power source until its maximum power point is reached under present conditions. Exemplary maximum power point schemes have been described above and also with reference to FIG. 8. Accordingly, the frequency is adjusted to cause the variable power source to operate at the target power point defined by the power controller based on a computed or determined maximum power point. As the mechanical load of the motor may vary during operation of the system, which will be reflected as variation in the current drawn by the motor drive, the power controller compensates for increased current by reducing the frequency of the fundamental voltage supplied to the motor to reduce its speed, thereby maintaining the impedance match.

Figure 9:
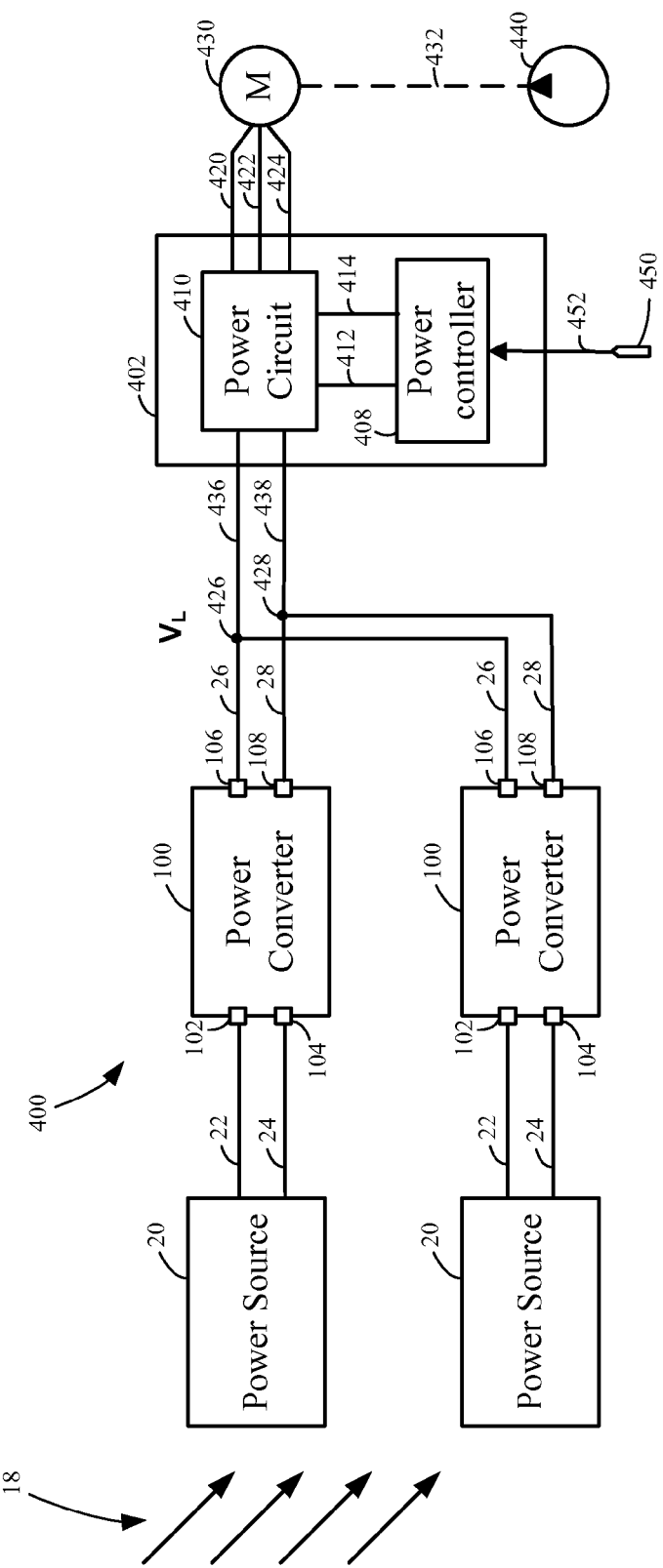
FIG. 9 is a block diagram of another embodiment of a power conversion system according to the disclosure.

Another embodiment according to the disclosure will now be described with reference to a block diagram of a power conversion system 400 shown in FIG. 9. Power conversion system 400 comprises two or more power sources 20, two or more power converters 100 coupled to bus nodes 426 and 428 which are connected via connectors 436 and 438 to a motor drive 402. Motor drive 402 is coupled to a motor 430. Variable power from power sources 20 is converted by power converters 100 and subsequently provided through bus nodes 426 and 428 to motor drive 402 where it is further converted into a form suitable to operate motor 430. Motor 430 is adapted to drive a pump 440 with a mechanical linkage device 432. Motor drive 402 includes a power controller 408 and a power circuit 410. A sensor 450 provides a demand signal to power controller 408 if pumping is required. Power controller 408 samples voltages and currents from power circuit 410 through lines 412 and provides switching signals to power circuit 410 through lines 414. Power circuit 410 converts, according to the switching signals, variable power received from power converters 100 and provides converted power to motor 430 through power lines 420, 422 and 424.

In one variation thereof, motor 430 is an induction motor or an electronically commutated motor (ECM). The load of the power converter comprises motor drive 402 and motor 430, and nodes 426 and 428 represent a DC power bus. In one variation of the constant voltage maximum power point tracking method, the DC power bus is unloaded by turning off the power switches of power circuit 410, thus disabling DC-AC conversion. After the motor stops due to mechanical inertia, $V_L$ is sampled to approximate $V_{LOC}$ at the input terminals of motor drive 402 and $V_{LMPP}$ is computed. Power controller 408 then increases or decreases the speed of motor 430 until $V_L$ equals $V_{LMPP}$, at which time the load impedance is substantially matched to the source impedance. While the speed of motor 430 is changed, the output power supplied by power sources 20 increases until the target power point is reached. After $V_L$ has been sampled, switching resumes. In the present embodiment, no voltage or power control is enforced by converters 100 within their defined operating voltage range. In one example, overvoltage limits are enforced, but only when the output voltage exceeds the operating voltage range. Due to the transparent nature of converter 100, the variable impedance load is capable to achieve maximum power point control of the variable power source 20 in an effective manner without sampling the variable power source 20 voltage or current.

In a further variation, power converter 100 is attached to variable power source 20. The output terminals of variable power source 20 are connected to input terminals 102, 104 to minimize the length and related inductance of conductors 22, 24. In one example, variable power source 20 is a photovoltaic source and power converter 100 is attached to the back side of the photovoltaic source to protect power converter 100 from solar radiation.

A variable power source has been described with reference to its voltage which is increased by a converter to a level suitable to drive a load. In one variation described with reference to FIG. 9, multiple power sources and converters are connected in series, and the converters are connected in parallel to form a DC bus which is provided to a DC/AC converter to drive a load. In one example, a power source comprises a string of 72 photovoltaic cells connected in series. The voltage across the string is provided to the converter, where it is increased.

In a further embodiment of a power conversion system according to the disclosure, a single photovoltaic cell is integrated with a power converter to form a single-piece structure. In one example, the nominal photovoltaic cell voltage is about 0.5 Vdc and the power converter increases the nominal voltage by a factor of between about 600 and 1000. In another example, the power converter is a DC/DC converter which increases the nominal voltage to between about 300 Vdc and 500 Vdc. In a further example, the power converter comprises a planar structure and is affixed to the photovoltaic cell to form a single structure. In yet another example, the photovoltaic cell and the power converter are laminated together. In another version thereof, the photovoltaic cell and the power converter are mounted on a common structure before being laminated. In a still further example, integration into a single structure is made possible by the elimination of bulky components such as electrolytic capacitors and reduction of capacitances and inductances to negligible values. In another variation of the power conversion system, a plurality of the single-piece structures are mounted on a common support structure and connected in parallel to form an integrated power source.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A power conversion system comprising:
   an input terminal adapted to receive variable power having an input voltage from a variable power source having a source impedance;
   an output terminal adapted to provide converted power having an output voltage to a variable impedance load, the variable impedance load receiving a load voltage based on the output voltage;
   a power converter including a switching controller, power switches controlled by the switching controller, a transformer coupled to the power switches, a rectification circuit configured to rectify an alternating current output from the transformer, and input and output capacitors, the switching controller configured to switch the power switches in an alternating manner at a duty-cycle that is independent of the input or output voltage or current, to increase the input voltage to the output voltage, the power converter configured to reflect the source impedance of the variable power source to the variable impedance load.

2. A power conversion system as in claim 1, wherein the switching controller is configured to switch the power switches at a frequency of between about 20 KHz and 100 KHz to reduce the size of the input and output capacitors, and the input and output capacitors are selected such that the reflected source impedance represents a scaled version of the variable power source impedance characteristics.

3. A power conversion system as in claim 1, further comprising a motor drive as the variable impedance load and a maximum power point control logic adapted to vary the speed of a motor coupled to the motor drive based at least on the load voltage to cause the variable power source to operate at or near a maximum power point.

4. A power conversion system as in claim 3, further comprising a fluid pump coupled to the motor, wherein the power conversion system is configured to maximize a fluid pumping efficiency by causing the variable power source to operate at the target power point.

5. A power conversion system as in claim 3, further comprising a plurality of solar panels as the variable power source, and a plurality of power converter coupled to the plurality of solar panels and to the motor drive.

6. A power conversion system as in claim 3, wherein the power converter has an input impedance which is up to about 10% of the source impedance when the motor drive operates at the target power point.

7. A power conversion system as in claim 1, wherein the input and output impedances of the power converter are substantially negligible.

8. A power conversion system as in claim 1, further comprising a solar cell as the variable power source, wherein the power converter is integrated with the solar cell to form a single-piece structure.

9. A power conversion system as in any one of claim 1, wherein the switching controller is configured to switch the power switches at a frequency which is independent of the variable impedance load and the variable power source.

10. A power conversion system as in claim 9, wherein the switching controller is configured to switch the power switches in a symmetrical alternating mode at a maximum duty cycle.

11. A power conversion system as in claim 1, wherein the power converter is thermally insensitive in a temperature range between 10° C. and 40° C. and is insensitive to thermal cycling.

12. A power conversion system as in claim 1, wherein the power converter is devoid of electrolytic capacitors.

13. A method of operating a power conversion system, the method comprising:
    receiving a variable power having an input voltage from a variable power source having a source impedance;
    increasing, by a power converter, the input voltage to an output voltage by switching power switches in an alternating manner at a duty-cycle that is independent of the input or output voltage or current;
    receiving, by a variable impedance load, a load voltage based on the output voltage; and
    reflecting the source impedance to the variable impedance load with the power converter.

14. A method of operating a power conversion system as in claim 13, wherein the power converter includes a switching controller, the power switches controlled by the switching controller, a transformer coupled to the power switches, a rectification circuit configured to rectify an alternating current output from the transformer, and input and output capacitors, the switching controller configured to switch the power switches.

15. A method of operating a power conversion system as in claim 14, wherein the switching controller is configured to switch the power switches at a frequency of between about 20 KHz and 100 KHz to reduce the size of the input and output capacitors, and the input and output capacitors are selected such that the reflected source impedance represents a scaled version of the variable power source impedance characteristics.

16. A method of operating a power conversion system as in claim 13, further comprising:
    operating the power switches at a frequency which is independent of the variable impedance load and the variable power source.

17. A method of operating a power conversion system as in claim 13, further comprising:
    operating the power switches in a symmetrical alternating mode at a maximum duty cycle.

18. A method of operating a power conversion system as in claim 13, further comprising:
    varying, based on the load voltage, the speed of a motor coupled to the variable impedance load to operate the variable power source at a target power point corresponding to a maximum power point of the variable power source.

19. A method of operating a power conversion system as in claim 13, wherein the variable power source comprises a plurality of solar panels, further comprising:
    each of a plurality of power converters receiving variable power from each of the plurality of solar panels; and
    the variable impedance load receiving converted power from each of the plurality of power converters.

20. A power conversion system comprising:
    power converting means for increasing an input voltage of a variable power sourced by a variable power source into an output voltage, the power converting means including power switches and being configured to switch the power switches in an alternating manner at a duty-cycle that is independent of the input or output voltage or current;
    an input terminal coupled to the power converting means and adapted to receive the variable power from the variable power source; and
    an output terminal coupled to the power converting means and providing a converted power having the output voltage to the variable impedance load,
    the power converting means configured to reflect a source impedance of the variable power source to the variable impedance load.

* * * * *